United States Patent
Han

(10) Patent No.: US 10,634,336 B1
(45) Date of Patent: Apr. 28, 2020

(54) REPLACEABLE WATER-COOLED RADIATING DEVICE

(71) Applicant: Tai-Sheng Han, Taipei (TW)

(72) Inventor: Tai-Sheng Han, Taipei (TW)

(73) Assignee: EVGA CORPORATION, New Taipei (TW)

( * ) Notice: Subject to any disclaimer, the term of this patent is extended or adjusted under 35 U.S.C. 154(b) by 0 days.

(21) Appl. No.: 16/395,157

(22) Filed: Apr. 25, 2019

(51) Int. Cl.
| | |
|---|---|
| *F21V 29/58* | (2015.01) |
| *F21V 29/51* | (2015.01) |
| *F21V 29/502* | (2015.01) |
| *F21V 29/57* | (2015.01) |
| *F21V 33/00* | (2006.01) |

(52) U.S. Cl.
CPC ............ *F21V 29/58* (2015.01); *F21V 29/502* (2015.01); *F21V 29/51* (2015.01); *F21V 29/57* (2015.01); *F21V 33/00* (2013.01)

(58) Field of Classification Search
None
See application file for complete search history.

(56) References Cited

U.S. PATENT DOCUMENTS

| | | | |
|---|---|---|---|
| 2009/0101316 A1* | 4/2009 | Han | .......... F28D 15/00 165/104.33 |
| 2017/0030493 A1* | 2/2017 | Han | .......... F16L 9/20 |
| 2018/0213680 A1* | 7/2018 | Han | .......... G06F 1/20 |
| 2019/0317577 A1* | 10/2019 | Lin | .......... F04D 13/0673 |

* cited by examiner

*Primary Examiner* — Ashok Patel
(74) *Attorney, Agent, or Firm* — Che-Yang Chen; Law Office of Michael Chen

(57) ABSTRACT

The present invention provides a replaceable water-cooled radiating device, comprising a water-cooling module and a light-emitting module, the water-cooling module is provided with a control circuit, and the control circuit is provided with at least one electrical connector. The light-emitting module is disposed on a top of the water-cooling module and is provided with a driving circuit, the driving circuit is provided with at least one light-emitting component and at least one electrical conductive component, and the electrical conductive component is electrically connected to the electrical connector. Thereby the light-emitting module is electrically connected to the electrical connector and the control circuit via the electrical conductive component to conductibly emit light, and the light-emitting module can be directly detachably mounted on the water-cooling module to achieve the efficacy of the water-cooling module mounted with the replaceable light-emitting module.

9 Claims, 7 Drawing Sheets

REPLACEABLE WATER-COOLED RADIATING DEVICE

BACKGROUND OF THE INVENTION

Field of Invention

The present invention relates to a water-cooled radiating device, and more particularly to a replaceable water-cooled radiating device mounted with a replaceable light-emitting module.

Related Art

As the computing power of electronic devices increases, the internal electronic components of the devices generate a large amount of heat during operation. It is usually required to provide heat sink or heat dissipating fins on the electronic components to increase the heat dissipation area and improve the heat dissipation performance. But because the heat dissipation effect of the heat sink and the heat dissipating fins is limited, the prior art employs a water cooling device as a solution for enhancing the heat dissipation performance. The conventional water cooling device can exchange the heat absorbed from the heat generating component (processor or graphics processor) with a cooling liquid inside the water cooling device, and then the cooling liquid is circulated through a pump inside the water cooling device, and the water cooling device is connected to a heat sink through a plurality of tubes to allow the cooling liquid to circulate between the heat sink and the water cooling device to exchange and dissipate heat, so that the heat of the heat generating component can be quickly dissipated. Because the water cooling device is becoming more and more popular, the requirements for visual effect and exterior design are getting higher and higher, so the conventional water cooling device is provided with a light-emitting module to enhance the visual effect through the light of the light-emitting module. But the conventional water cooling devices are usually assembled with the light-emitting module at the factory, and therefore consumers can only buy them according to their preferences, and can't replace the light-emitting module according to their preferences. If different visual effects are required, the only solution is to purchase different water cooling devices, and thus the problem of increased purchase cost arises.

SUMMARY OF THE INVENTION

Therefore, in order to effectively solve the above problems, a main object of the present invention is to provide a replaceable water-cooled radiating device mounted with a replaceable light-emitting module.

A secondary object of the present invention is to provide a replaceable water-cooled radiating device that can save on purchase costs.

In order to achieve the above objects, the present invention provides a replaceable water-cooled radiating device, comprising a water-cooling module and a light-emitting module, wherein inside the water-cooling module is provided with a control circuit, the control circuit is provided with at least one electrical connector, and a bottom end of the electrical connector is in contact with and electrically connected to the control circuit. The light-emitting module is disposed on a top of the water-cooling module, and inside the light-emitting module is provided with a driving circuit. On the driving circuit is provided with at least one light-emitting component and at least one electrical conductive component, a top of the electrical conductive component is electrically connected to the driving circuit, and a bottom of the electrical conductive component is electrically connected to the electrical connector. Thereby the light-emitting module is electrically connected to the electrical connector and the control circuit via the electrical conductive component to conductibly emit light, and the light-emitting module can be directly detachably mounted on the water-cooling module to achieve the efficacy of the water-cooling module mounted with the replaceable light-emitting module.

According to an embodiment of the replaceable water-cooled radiating device of the present invention, wherein the top of the water-cooling module further has an upper cover, the upper cover is formed with at least one perforated upper cover through hole, and the electrical connector is disposed in the upper cover through hole.

Wherein a bottom of the light-emitting module is further provided with a base, the base is formed with at least one perforated base through hole, and the electrical conductive component is disposed in the base through hole.

According to an embodiment of the replaceable water-cooled radiating device of the present invention, wherein the upper cover further has at least one connecting groove, and the connecting groove is formed at a position above the upper cover through hole.

According to an embodiment of the replaceable water-cooled radiating device of the present invention, wherein the upper cover further has at least one embed groove.

According to an embodiment of the replaceable water-cooled radiating device of the present invention, wherein the base further has at least one convex portion, the convex portion is formed at a position below the base through hole, and the convex portion is assembled with the connecting groove.

According to an embodiment of the replaceable water-cooled radiating device of the present invention, wherein the base is formed with at least one protruding rib at a position of a bottom surface, and the protruding rib is assembled with the embed groove.

According to an embodiment of the replaceable water-cooled radiating device of the present invention, wherein the base further has at least one limiting slot, the limiting slot is formed at a position above the base through hole, and the electrical conductive component is assembled in the limiting slot.

According to an embodiment of the replaceable water-cooled radiating device of the present invention, wherein a light-transmissive cover is disposed on the light-emitting module.

DETAILED DESCRIPTION OF THE INVENTION

The above objects of the present invention, as well as the structural and functional features, will be described in accordance with the preferred embodiments of the drawings.

Figure 1:
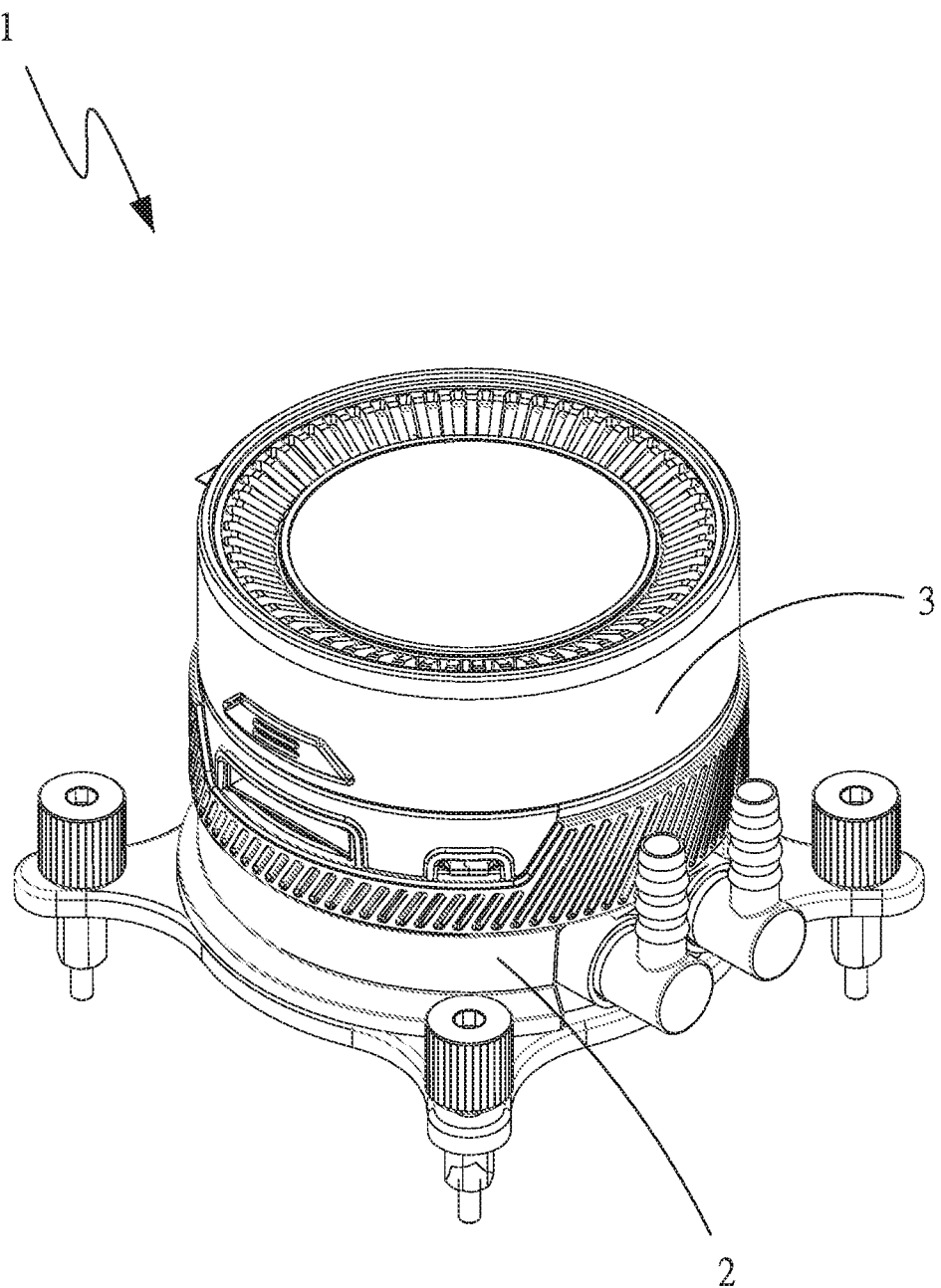
FIG. 1 is a perspective assembled view of a preferred embodiment of the present invention.
Figure 2:
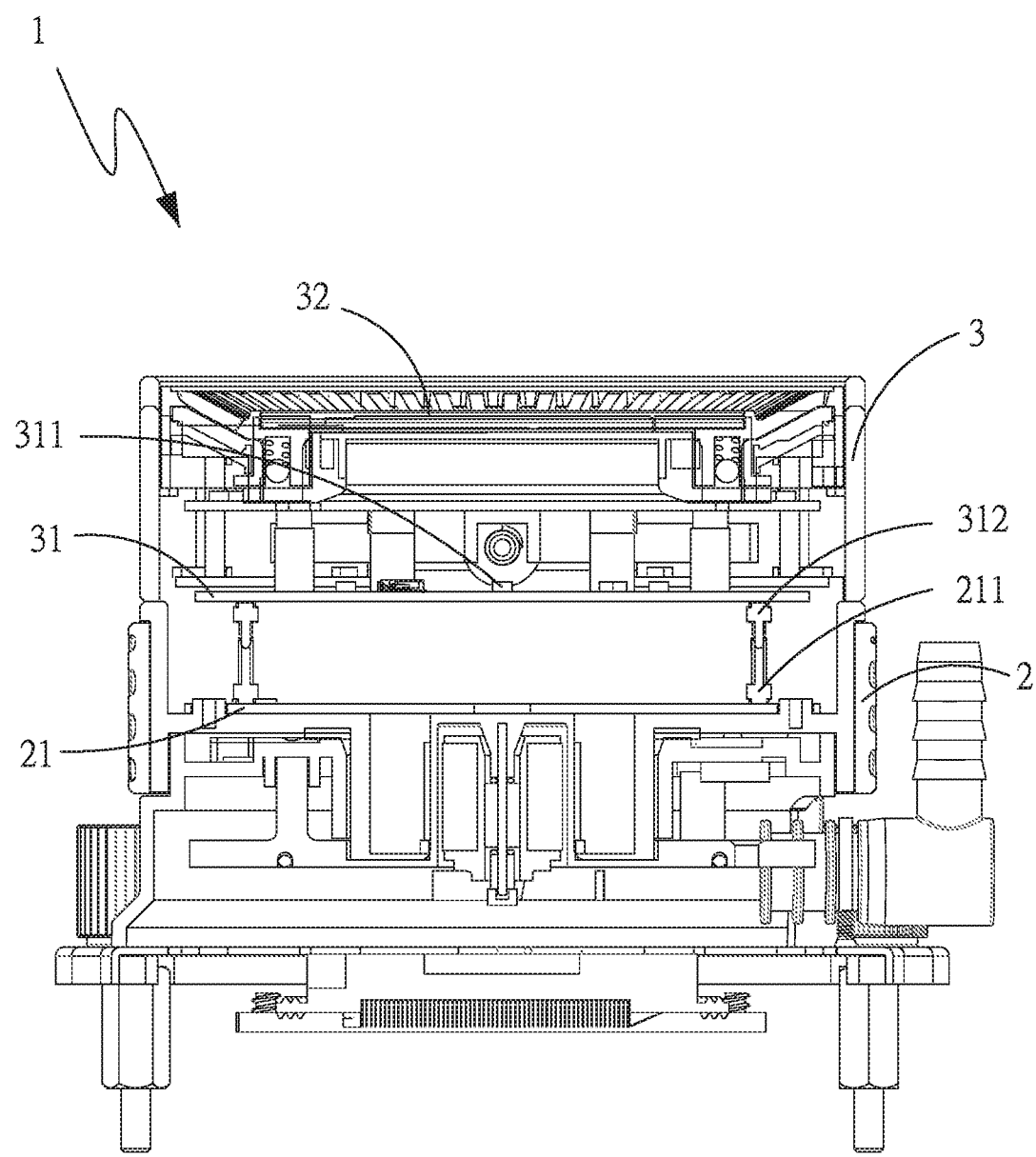
FIG. 2 is a cross-sectional assembled view of a preferred embodiment of the present invention.
Figure 3:
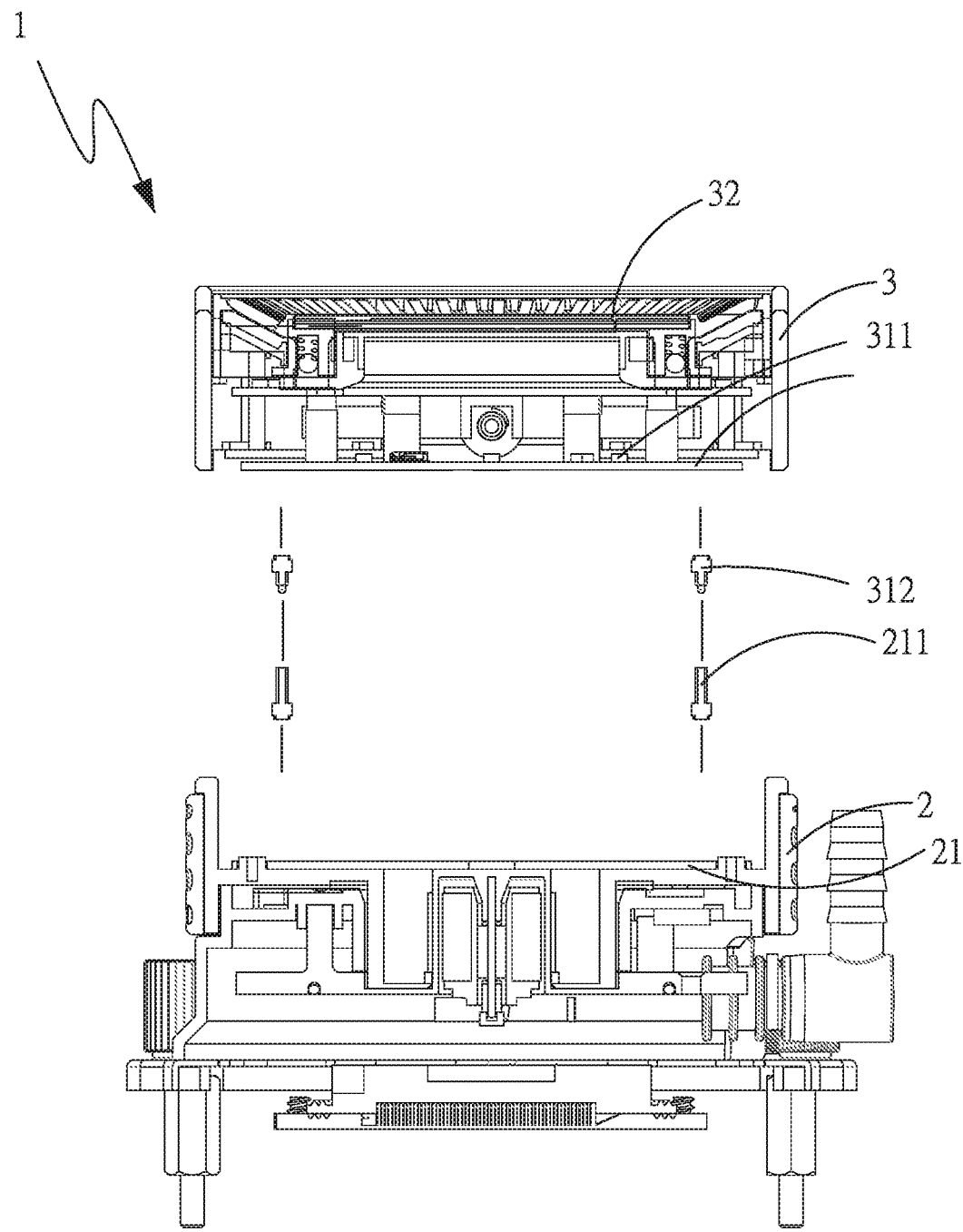
FIG. 3 is a cross-sectional exploded view of a preferred embodiment of the present invention.

Please refer to FIG. 1 and FIG. 2 and FIG. 3, which are perspective assembled view, cross-sectional assembled view and cross-sectional exploded view of a preferred embodiment of the present invention respectively. It can be clearly seen from the drawings that a water-cooled radiating device 1 comprises a water-cooling module 2 and a light-emitting module 3.

Wherein a control circuit 21 is disposed in the water-cooling module 2, and the control circuit 21 is provided with at least one electrical connector 211. A bottom end of the electrical connector 211 is connected to the control circuit 21, the electrical connector 211 is electrically connected to the control circuit 21, and the control circuit 21 can supply power to the electrical connector 211.

Wherein the light-emitting module 3 is disposed on a top of the water-cooling module 2, and the light-emitting module 3 is covered on an upper side of an upper cover 22. The light-emitting module 3 is internally provided with a driving circuit 31, and a light-transmissive cover 32 is disposed on a top of the light-emitting module 3. On the driving circuit 31 is provided with at least one light-emitting component 311 and at least one electrical conductive component 312, a top of the electrical conductive component 312 is electrically connected to the driving circuit 31, and a bottom of the electrical conductive component 312 is electrically connected to the electrical connector 211.

The control circuit 21 can supply power to the electrical connector 211, and the electrical conductive component 312 receives the power and supplies to the driving circuit 31. The driving circuit 31 drives the light-emitting components 311 to generate a light source, and the light source is illuminated on the light-transmissive cover 32 to cause the light-transmissive cover 32 to generate light with a special visual effect; or when the light-transmissive cover 32 has a pattern, the light-transmissive cover 32 will be illuminated to create a light pattern with special visual effect.

Figure 4:
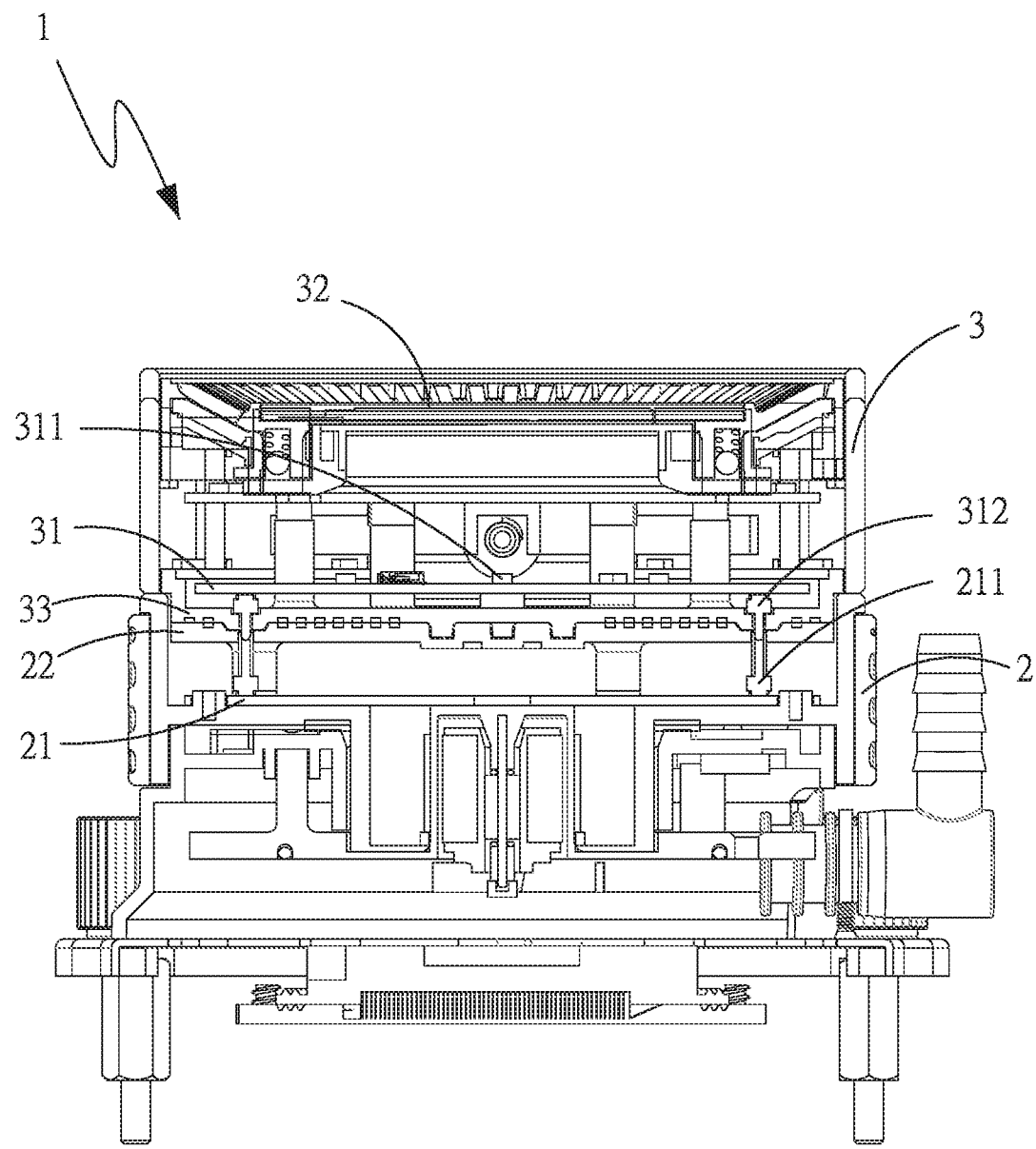
FIG. 4 is another cross-sectional assembled view of a preferred embodiment of the present invention.
Figure 5:
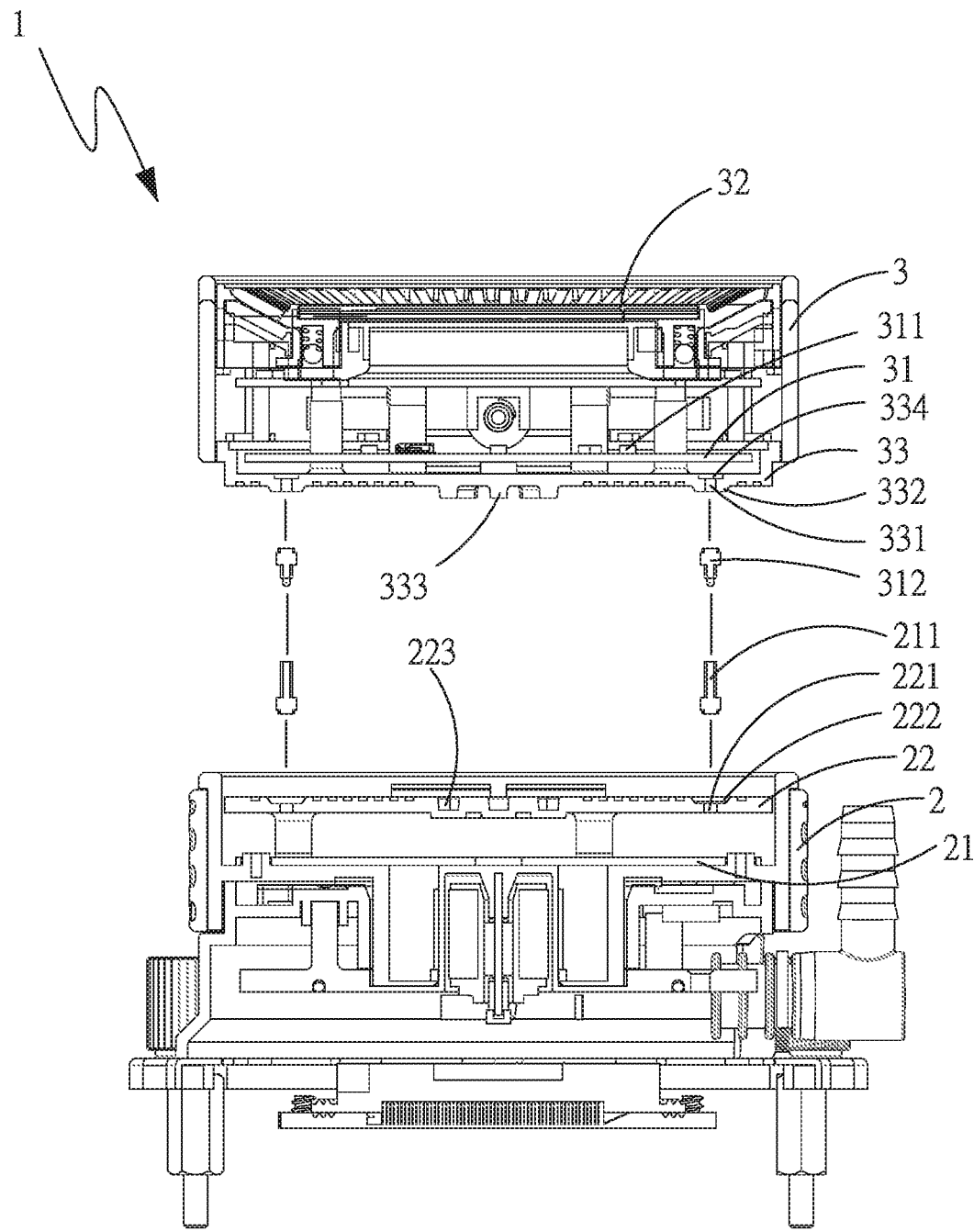
FIG. 5 is another cross-sectional exploded view of a preferred embodiment of the present invention.

Please refer to FIG. 4 and FIG. 5 at the same time, which are another cross-sectional assembled view and another cross-sectional exploded view of a preferred embodiment of the present invention respectively. Wherein the water-cooling module 2 is provided with an upper cover 22 at a position of the top. The upper cover 22 is formed with at least one upper cover through hole 221, at least one connecting groove 222, and at least one embed groove 223. The upper cover through hole 221 is penetrated through the upper cover 22, the connecting groove 222 is formed at a position above the upper cover through hole 221, and the embed groove 223 is formed at a central position of the upper cover 22. The electrical connector 211 is disposed in the upper cover through hole 221 and electrically connected to the control circuit 21, and the control circuit 21 can supply power to the electrical connector 211.

A bottom of the light-emitting module 3 is provided with a base 33. The base 33 is formed with at least one base through hole 331, at least one convex portion 332, at least one protruding rib 333, and at least one limiting slot 334. The base through hole 331 is penetrated through the base 33, the convex portion 332 is formed at a position below the base through hole 331, and the convex portion 332 is assembled with the connecting groove 222. The protruding rib 333 is assembled with the embed groove 223. The limiting slot 334 is formed at a position above the base through hole 331. The electrical conductive component 312 is disposed in the base through hole 331 and assembled in the limiting slot 334, the top of the electrical conductive component 312 is electrically connected to the driving circuit 31, and the bottom of the electrical conductive component 312 is electrically connected to the electrical connector 224.

The control circuit 21 can supply power to the electrical connector 211, and the electrical conductive component 312 receives the power and supplies to the driving circuit 31. The driving circuit 31 drives the light-emitting components 311 to generate a light source, and the light source is illuminated on the light-transmissive cover 32 to cause the light-transmissive cover 32 to generate light with a special visual effect; or when the light-transmissive cover 32 has a pattern, the light-transmissive cover 32 will be illuminated to create a light pattern with special visual effect.

Figure 6:
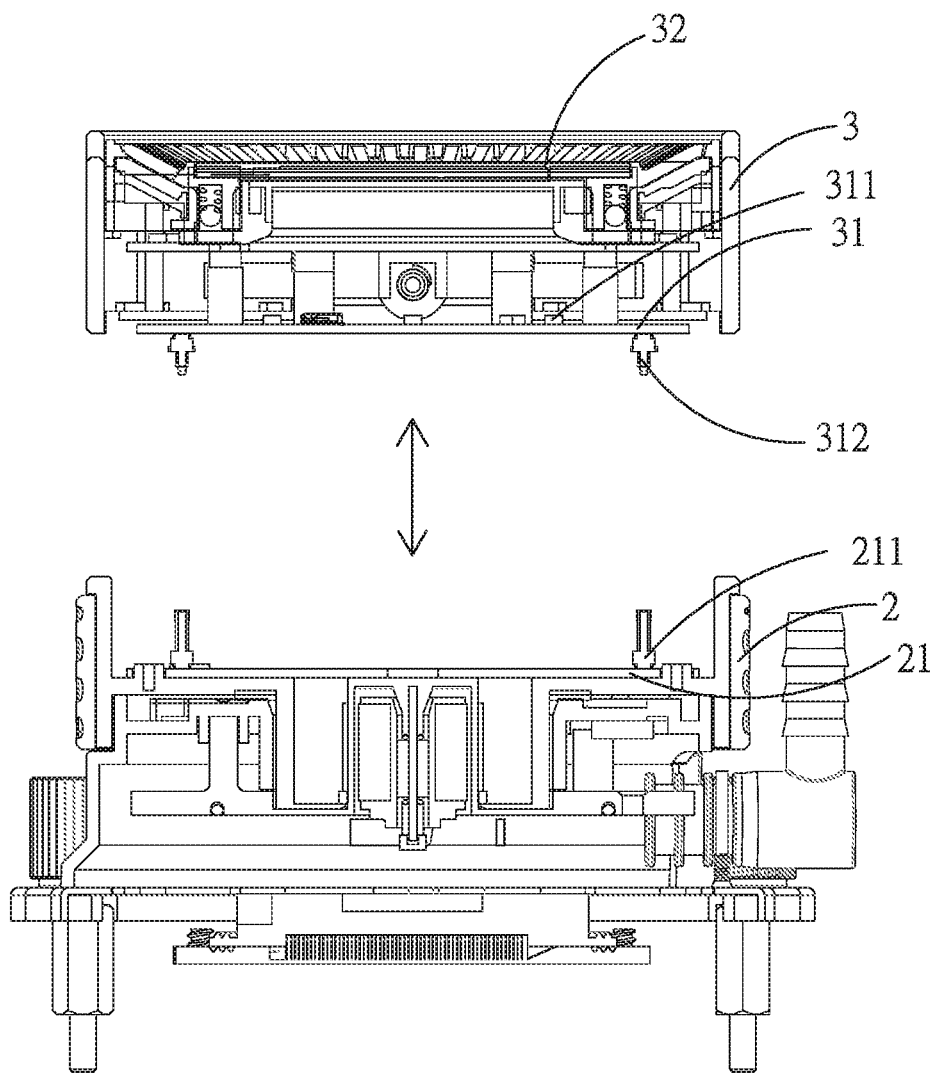
FIG. 6 is a first schematic view of the implementation of a preferred embodiment of the present invention.
Figure 7:
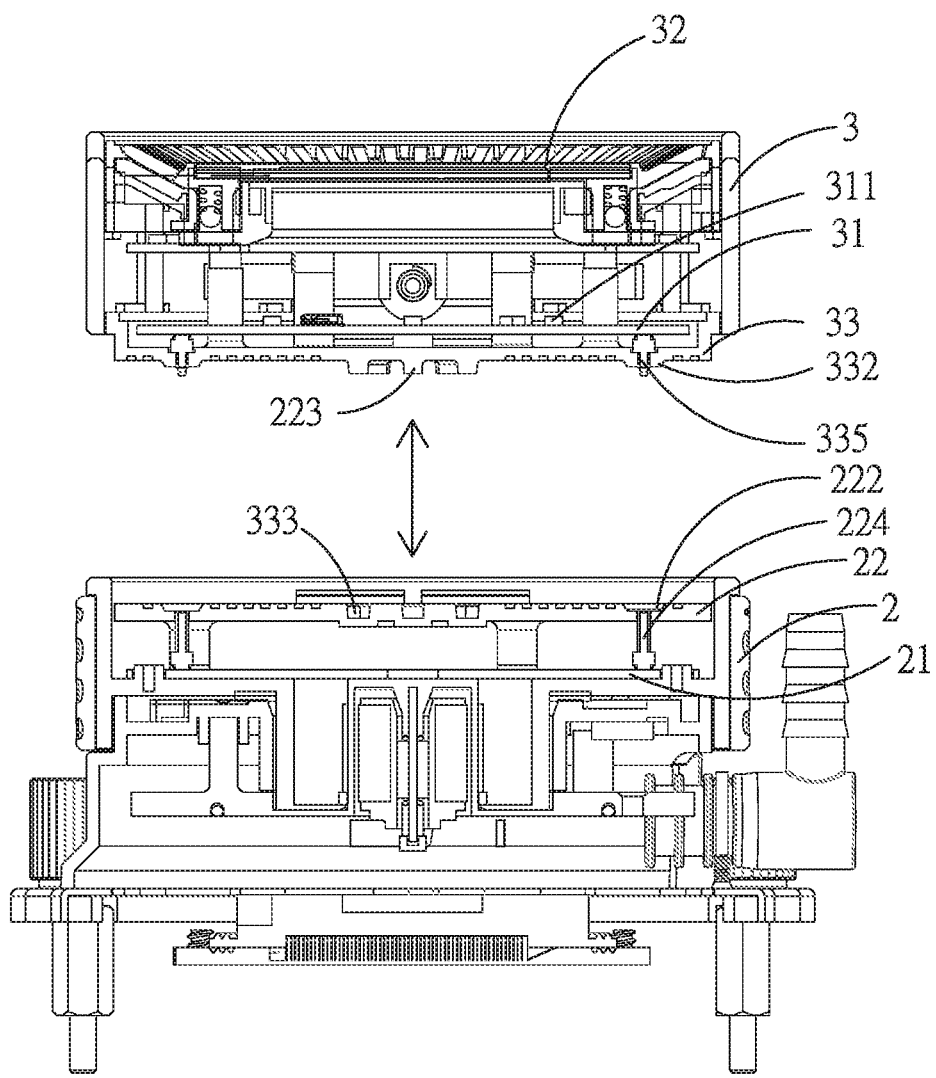
FIG. 7 is a second schematic view of the implementation of a preferred embodiment of the present invention.

Please refer to the foregoing drawings and FIGS. 6 and 7 for first schematic view and second schematic view of the implementation of a preferred embodiment of the present invention. It can be clearly seen from the figures that when the light-emitting module 3 of the water-cooled radiating device 1 needs to be replaced, the light-emitting module 3 can be directly removed from the water-cooling module 2, so that the electrical conductive component 312 is detached from the electrical connector 211, thereby replacing the light-emitting module 3 with the different light-transmissive cover 32. When the light-emitting module 3 with the different light-transmissive cover 32 is mounted on the water-cooling module 2, the electrical conductive component 312 can be electrically connected to the electrical connector 211, and the driving circuit 31 is electrically connected to the control circuit 21 and receives power for the object of generating a light source, and achieving the efficacy of replacing the light-emitting module 3 and saving the purchase cost. Alternatively, in another embodiment, when the light-emitting module 3 of the water-cooled radiating device 1 needs to be replaced, the light-emitting module 3 can be directly removed from the water-cooling module 2, so that the electrical conductive component 312 is detached from the electrical connector 211, thereby replacing the light-emitting module 3 with the different light-transmissive cover 32. When the light-emitting module 3 with the different light-transmissive cover 32 is mounted on the water-cooling module 2, the electrical conductive component 312 can be electrically connected to the electrical connector 211. At the same time, the convex portion 332 is assembled in the connecting groove 222, and the protruding rib 333 is assembled in the embed groove 223, so that the light-emitting module 3 can be stably disposed on the water-cooling module 2. Further, the driving circuit 31 is electrically connected to the control circuit 21 and receives power for the object of generating a light source, and achieving the efficacy of replacing the light-emitting module 3 and saving the purchase cost.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. A replaceable water-cooled radiating device, comprising:
   a water-cooling module, inside the water-cooling module being provided with a control circuit, the control circuit being provided with at least one electrical connector, and a bottom end of the electrical connector being electrically connected to the control circuit; and
   a light-emitting module, the light-emitting module being disposed on a top of the water-cooling module, and inside the light-emitting module being provided with a driving circuit, on the driving circuit being provided with at least one light-emitting component and at least one electrical conductive component, a top of the electrical conductive component being electrically connected to the driving circuit, and a bottom of the electrical conductive component being electrically connected to the electrical connector.

2. The replaceable water-cooled radiating device as claimed in claim 1, wherein the top of the water-cooling module further has an upper cover, the upper cover is formed with at least one perforated upper cover through hole, and the electrical connector is disposed in the upper cover through hole.

3. The replaceable water-cooled radiating device as claimed in claim 2, wherein a bottom of the light-emitting module is further provided with a base, the base is formed with at least one perforated base through hole, and the electrical conductive component is disposed in the base through hole.

4. The replaceable water-cooled radiating device as claimed in claim 3, wherein the upper cover further has at least one connecting groove, and the connecting groove is formed at a position above the upper cover through hole.

5. The replaceable water-cooled radiating device as claimed in claim 3, wherein the upper cover further has at least one embed groove.

6. The replaceable water-cooled radiating device as claimed in claim 4, wherein the base further has at least one convex portion, the convex portion is formed at a position below the base through hole, and the convex portion is assembled with the connecting groove.

7. The replaceable water-cooled radiating device as claimed in claim 5, wherein the base is formed with at least one protruding rib at a position of a bottom surface, and the protruding rib is assembled with the embed groove.

8. The replaceable water-cooled radiating device as claimed in claim 3, wherein the base further has at least one limiting slot, the limiting slot is formed at a position above the base through hole, and the electrical conductive component is assembled in the limiting slot.

9. The replaceable water-cooled radiating device as claimed in claim 1, wherein a light-transmissive cover is disposed on the light-emitting module.

* * * * *